(12) United States Patent
Murakami et al.

(10) Patent No.: US 6,889,983 B2
(45) Date of Patent: May 10, 2005

(54) GASKET FOR HIGH-TEMPERATURE JOINT AND METHOD OF FABRICATING THE SAME

(75) Inventors: Yasunori Murakami, Wako (JP); Masanobu Miki, Wako (JP); Koichi Nakajima, Saitama (JP); Yoshimichi Kurashina, Saitama (JP); Akira Tanaka, Saitama (JP)

(73) Assignees: Honda Giken Kogyo Kabushiki Kaisha, Tokyo (JP); Nippon Leakless Industry Co., Ltd., Tokyo (JP)

( * ) Notice: Subject to any disclaimer, the term of this patent is extended or adjusted under 35 U.S.C. 154(b) by 34 days.

(21) Appl. No.: 10/087,770

(22) Filed: Mar. 5, 2002

(65) Prior Publication Data

US 2002/0190483 A1 Dec. 19, 2002

(30) Foreign Application Priority Data

Mar. 5, 2001 (JP) .................................... 2001-060198

(51) Int. Cl.$^7$ ............................................. F16J 15/08
(52) U.S. Cl. ................ 277/627; 277/535; 277/922; 277/936
(58) Field of Search ................. 277/627, 650, 277/535, 592, 936, 922, 924

(56) References Cited

U.S. PATENT DOCUMENTS

| 4,209,177 A | * | 6/1980 | Hall ............................ 277/608 |
| 4,271,228 A | * | 6/1981 | Foster et al. ................ 442/322 |
| 4,417,733 A | * | 11/1983 | Usher ......................... 264/239 |
| 4,462,603 A | * | 7/1984 | Usher et al. ................ 277/627 |
| 4,516,782 A | * | 5/1985 | Usher ......................... 264/258 |
| 4,547,434 A | * | 10/1985 | Sumiyoshi et al. ......... 428/609 |
| 4,551,393 A | * | 11/1985 | Sumiyoshi et al. ......... 428/609 |
| 4,559,249 A | * | 12/1985 | Arigaya et al. ............ 428/34.1 |
| 4,601,476 A | * | 7/1986 | Usher et al. ................ 277/627 |
| 4,607,851 A | * | 8/1986 | Usher ......................... 264/258 |
| 4,659,091 A | * | 4/1987 | Baasner et al. ............ 428/34.5 |
| 4,762,330 A | * | 8/1988 | Lonne et al. ............... 277/627 |
| 4,871,181 A | * | 10/1989 | Usher et al. ................ 277/627 |
| 4,902,024 A | * | 2/1990 | Takenoshita ................ 277/627 |
| 4,951,954 A | * | 8/1990 | MacNeill .................... 277/627 |
| 4,955,218 A | * | 9/1990 | Brandener ................... 72/146 |
| 5,040,805 A | * | 8/1991 | Ozora ......................... 277/627 |
| 5,065,493 A | * | 11/1991 | Ozora ......................... 29/505 |
| 5,451,064 A | * | 9/1995 | Mercuri et al. ............ 277/625 |
| 5,462,291 A | * | 10/1995 | Maeda et al. ............... 277/507 |
| 5,499,825 A | * | 3/1996 | Maeda et al. ............... 277/626 |
| 5,527,599 A | * | 6/1996 | Hall et al. .................. 442/104 |
| 5,615,479 A | * | 4/1997 | Maeda et al. .............. 29/888.3 |
| 6,152,453 A | * | 11/2000 | Kashima et al. ............ 277/404 |

* cited by examiner

Primary Examiner—William L. Miller
(74) Attorney, Agent, or Firm—Young & Thompson

(57) ABSTRACT

Provided is a gasket capable of maintaining a high sealing property under a high temperature, in which a gasket basic substance and coverture are not sublimated or decomposed when the gasket is used under a high temperature above 500° C. The gasket for a high-temperature joint includes a gasket basic substance formed by filling a heat-resistant filler mainly composed of diatomaceous earth into gaps of a meshed metallic reinforcing member, and coverture made of a heat-resistant antifriction material mainly composed of a mixture of boron nitride and polytetrafluoroethylene resin for covering a surface of the gasket basic substance.

8 Claims, 6 Drawing Sheets

Prior Art

GASKET FOR HIGH-TEMPERATURE JOINT AND METHOD OF FABRICATING THE SAME

BACKGROUND OF THE INVENTION

1. Field of the Invention

This invention relates to a gasket to be used for a high-temperature joint such as a joint in mid-course of exhaust pipes connected with an automobile engine and to a method of fabricating the gasket.

2. Description of Related Art

As shown in FIG. 5, a joint 1 is normally provided in mid-course of exhaust pipes which release high-temperature exhaust gas discharged from an automobile engine to the atmosphere via a catalytic device and a silencer, in order not to propagate engine vibration directly to the catalytic device or the silencer. The joint 1 to be heated up by the exhaust gas normally incorporates a gasket 2 for preventing leakage of the exhaust gas therefrom.

The gasket 2 thus incorporated in the high-temperature joint 1 in mid-course of the exhaust pipes has been formed conventionally in the following manners that: a heat-resistant sheet 3 made of a combustible graphite sheet (an expanded graphite sheet) and a reinforcing member 4 made of a braid-over-braid knitted stainless wire fabric are mixed and integrated together as shown in FIG. 6A; the reinforcing member 4 integrated with the heat-resistant sheet 3 are then wound into a tubular shape as shown in FIG. 6B; the tubularly wound object is pressed in a mold, whereby the tubularly wound object is formed into an annular object having a hemispheric outer peripheral face corresponding to the cuplike joint 1 as shown in FIGS. 6C and 6D; and coverture 5 made of an antifriction material such as boron nitride, mica, silica, alumina, or polytetrafluoroethylene resin is provided on the outer peripheral face of the annular object by coating for the purpose of reducing abnormal friction sounds and a coefficient of friction.

Incidentally, the above-described gasket 2 for a high-temperature joint has been conventionally used in a temperature range up to 500° C. However, as emission control is more tightened in recent years, the temperature of the exhaust gas is increased whereby the gasket is exposed to an environment at the temperature exceeding 500° C. Such a temperature rise has incurred a problem that the conventional combustible graphite sheet (the expanded graphite sheet) as the heat-resistant sheet 3 for the gasket 2 might not be durable for use because the heat-resistant sheet 3 would be sublimated and decomposed under oxidizing atmosphere above 500° C. With that in mind, the inventor of this invention has actually conducted a proof test by means of fitting the conventional gasket 2 to the joint 1 in mid-course of the exhaust pipes connected with the engine. Upon visual check of the gasket 2 after the test, it was only the stainless wire fabric of the reinforcing member 4 that was observed.

SUMMARY OF THE INVENTION

An object of this invention is to provide a gasket sufficiently resolving the foregoing problem of heat resistance of the conventional gasket. A gasket for a high-temperature joint according to this invention includes a gasket basic substance formed by filling gaps of any one of a meshed metallic reinforcing member and a woollike metallic reinforcing member with a heat-resistant filler mainly composed of any of diatomaceous earth, synthetic mica and a mixture thereof, and coverture made of a heat-resistant antifriction material mainly composed of any of boron nitride, polytetrafluoroethylene resin and a mixture thereof for covering a surface of the gasket basic substance.

Moreover, a gasket for a high-temperature joint according to this invention includes a gasket basic substance formed by filling gaps of any one of a meshed metallic reinforcing member and a woollike metallic reinforcing member with a heat-resistant antifriction material mainly composed of any of boron nitride, polytetrafluoroethylene resin and a mixture thereof, and coverture made of the heat-resistant antifriction material for covering a surface of the gasket basic substance.

In these gaskets for a high-temperature joint, the gasket basic substance is formed in a manner that either a heat-resistant filler mainly composed of diatomaceous earth, synthetic mica or a mixture thereof, or a heat-resistant antifriction material mainly composed of boron nitride, polytetrafluoroethylene resin or a mixture thereof is filled into gaps of a meshed or woollike metallic reinforcing member. Then, a surface of the gasket basic substance is covered with coverture made of a heat-resistant antifriction material mainly composed of boron nitride, polytetrafluoroethylene resin or a mixture thereof. Accordingly, unlike the conventional gasket using a combustible graphite sheet, the gasket basic substance and the coverture are not sublimated and decomposed when the gasket is used at a temperature above 500° C. Therefore, according to the gasket for a high-temperature joint of this invention, a high sealing property can be maintained for a long period at a high temperature.

Moreover, in these gaskets for a high-temperature joint, the surface of the gasket basic substance is covered with the coverture made of the heat-resistant antifriction material mainly composed of boron nitride, polytetrafluoroethylene resin or a mixture thereof. Accordingly, the gasket possesses a low coefficient of friction on the surface thereof as well as high heat resistance as described above. Therefore, according to the gasket for a high-temperature joint of this invention, slidable contact between the reinforcing member and the joint inside the joint imparts smoother sliding movement, thus effectuating interception of engine vibration.

Incidentally, it is preferable that the meshed metallic reinforcing member is made of metallic wires such as stainless steel, for example. It is because use of the metallic wires can enhance heat resistance, strength and corrosion resistance of the reinforcing member, thus effectuating longer usage of the gasket.

Meanwhile, a method of fabricating a gasket for a high-temperature joint according to this invention includes the steps of filling a heat-resistant filler in a state of an aqueous solution mainly composed of any of diatomaceous earth, synthetic mica and a mixture thereof into gaps of any one of a pre-formed meshed metallic reinforcing member and a pre-formed woollike metallic reinforcing member, forming a gasket basic substance by solidifying the heat-resistant filler according to a thixotropic phenomenon and by drying subsequently, covering a surface of the gasket basic substance with a heat-resistant antifriction material mainly composed of any of boron nitride, polytetrafluoroethylene resin and a mixture thereof, and forming the gasket basic substance into predetermined dimensions and shape.

According to the fabricating method as described above, since the heat-resistant filler in the state of an aqueous solution mainly composed of diatomaceous earth, synthetic mica or a mixture thereof is filled into the gaps of the pre-formed meshed or woollike metallic reinforcing member, the heat-resistant filler can be readily filled into the gaps of the reinforcing member. Moreover, the gasket basic substance is formed in a manner that the reinforcing member is pulled out after the heat-resistant filler is solidified by the thixotropic phenomenon and then the heat-resistant filler is dried out. Accordingly, dripping off hardly occurs when the reinforcing member is pulled out of the aqueous solution of the heat-resistant filler. Therefore, it is possible to retain the heat-resistant filler easily and securely inside the gaps of the reinforcing member, whereby the gasket basic substance can be efficiently formed.

Thereafter, the surface of the gasket basic substance is covered with the heat-resistant antifriction material mainly composed of boron nitride, polytetrafluoroethylene resin or a mixture thereof, and then the gasket basic substance is formed into the predetermined dimensions and shape. Accordingly, it is possible to fabricate the gasket for a high-temperature joint in accurate dimensions and shape, of which the surface is covered sufficiently with the coverture of the heat-resistant antifriction material.

Incidentally, it is preferable that the aqueous solution of the heat-resistant filler mainly composed of diatomaceous earth, synthetic mica or a mixture thereof is composed of total 100 wt % in combination with water within 85 wt %, any of diatomaceous earth, synthetic mica and a mixture thereof within 20 wt %, and synthetic bentonite within 5 wt %. It is because flowability of the aqueous solution of the heat-resistant filler is reduced if diatomaceous earth, synthetic mica or the mixture thereof is excessive, whereby filling of the heat-resistant filler into the gaps of the reinforcing member becomes difficult. Moreover, a little addition of synthetic bentonite enables the aqueous solution to cause the thixotropic phenomenon.

Meanwhile, a method of fabricating a gasket for a high-temperature joint includes the steps of filling a heat-resistant antifriction material in a state of an aqueous solution mainly composed of any of boron nitride, polytetrafluoroethylene resin and a mixture thereof into gaps of a pre-formed metallic reinforcing member, forming a gasket basic substance by solidifying the heat-resistant antifriction material according to a dilatancy phenomenon and by drying subsequently, covering a surface of the gasket basic substance with the heat-resistant antifriction material, and forming the gasket basic substance into predetermined dimensions and shape.

According to the fabricating method as described above, since the heat-resistant antifriction material in the state of an aqueous solution mainly composed of boron nitride, polytetrafluoroethylene resin or a mixture thereof is filled into the gaps of the pre-formed metallic reinforcing member, the heat-resistant antifriction material can be readily filled into the gaps of the reinforcing member. Moreover, since the gasket basic substance is formed in a manner that the reinforcing member is pulled out after the heat-resistant antifriction material is solidified by the dilatancy phenomenon and then the heat-resistant filler is dried out. Accordingly, dripping off hardly occurs when the reinforcing member is pulled out of the aqueous solution of the heat-resistant antifriction material. Therefore, it is possible to retain the heat-resistant antifriction material easily and securely inside the gaps of the reinforcing member, whereby the gasket basic substance can be efficiently formed.

Thereafter, the surface of the gasket basic substance is covered with the heat-resistant antifriction material mainly composed of boron nitride, polytetrafluoroethylene resin or a mixture thereof, and then the gasket basic substance is formed into the predetermined dimensions and shape. Accordingly, it is possible to fabricate the gasket for a high-temperature joint in accurate dimensions and shape, of which the surface is covered sufficiently with the coverture of the heat-resistant antifriction material.

Incidentally, it is preferable that the aqueous solution of the heat-resistant antifriction material is composed of total 100 wt % in combination with boron nitride dispersion within 90 wt % containing 20 wt % boron nitride, polytetrafluoroethylene resin dispersion within 70 wt % containing 60 wt % polytetrafluoroethylene resin solid, and boron nitride powder within 20 wt %. It is because flowability of the aqueous solution of the heat-resistant antifriction material is reduced if boron nitride or solid content of polytetrafluoroethylene resin is excessive in the dispersion, whereby filling of the heat-resistant antifriction material into the gaps of the reinforcing member becomes difficult. Moreover, a little addition of boron nitride powder enables the aqueous solution to cause the dilatancy phenomenon.

Moreover, it is preferable that the reinforcing member and the aqueous solution of any of the heat-resistant filler and the heat-resistant antifriction material are severally deaerated under reduced pressure atmosphere and the reinforcing member is immersed into the aqueous solution under reduced pressure atmosphere in the step of filling any of the heat-resistant filler and the heat-resistant antifriction material in the state of the aqueous solution into the gaps of the metallic reinforcing member in the foregoing fabricating method. In this way, it is surely possible to prevent bubbles from remaining inside the heat-resistant filler, whereby strength of the gasket basic substance can be enhanced.

Furthermore, it is preferable that the meshed metallic reinforcing member is made of metallic wires such as stainless steel, for example. It is because use of the metallic wires can enhance heat resistance, strength and corrosion resistance of the reinforcing member, thus effectuating longer usage of the gasket. As for density of the reinforcing member, density in a range from 2.0 to 4.0 g/cm$^3$ is preferred in view of a balance between strength and a filling property.

DETAILED DESCRIPTION OF THE PREFERRED EMBODIMENTS

Figure 1:
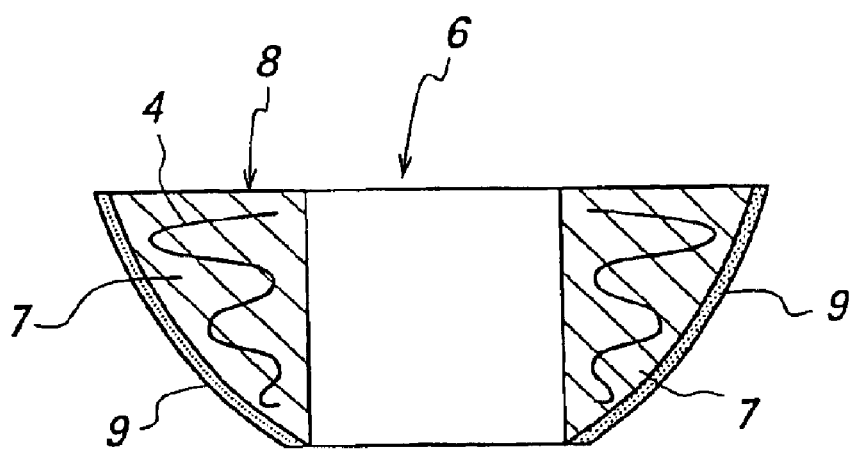
FIG. 1 is an outlined cross-sectional view showing one embodiment of a gasket for a high-temperature joint according to this invention.

Now, embodiments of this invention will be described in detail based on the accompanying drawings. Here, FIG. 1 is a cross-sectional view showing one embodiment of a gasket for a high-temperature joint of this invention. In the drawing, similar parts to the conventional example will be denoted by the same reference numerals.

A gasket 6 of this embodiment includes a gasket basic substance 8 formed by filling a heat-resistant filler 7 mainly composed of diatomaceous earth into gaps of a meshed metallic reinforcing member 4, and coverture 9 made of a heat-resistant antifriction material mainly composed of a mixture of boron nitride and polytetrafluoroethylene resin for covering a surface of the gasket basic substance 8.

Figure 2:
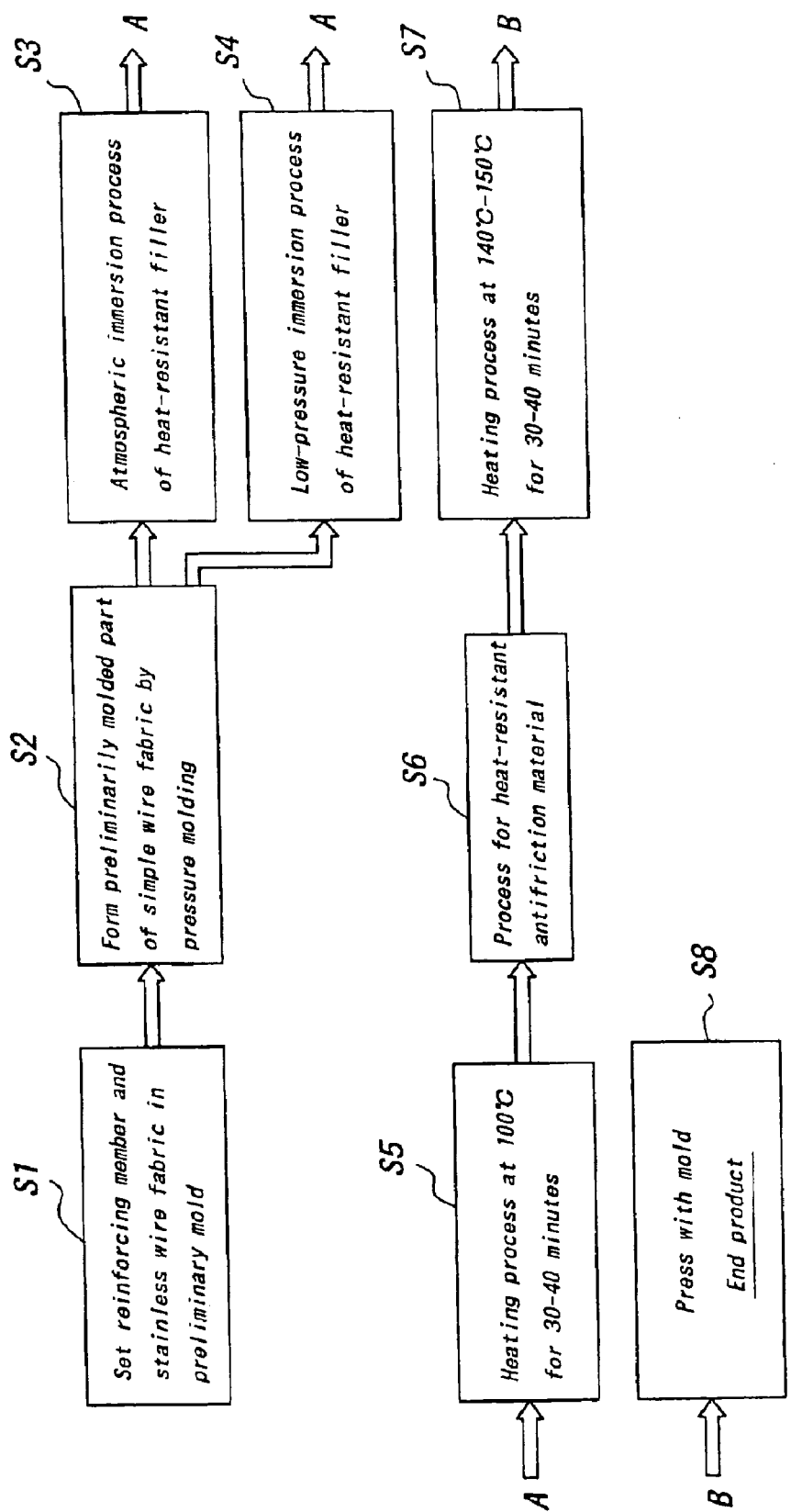
FIG. 2 is a process chart showing one embodiment of a fabricating method according to this invention for use in fabrication of the gasket for a high-temperature joint of the foregoing embodiment.

The gasket 6 of this embodiment is fabricated as described below in accordance with a fabricating method as shown in FIG. 2, which is one embodiment of a fabricating method of this invention. Specifically, here in Step S1 as shown in FIG. 2, a tubularly wound object made of braid-over-braid knitted stainless wire fabric as the reinforcing member 4 is set inside a preliminary mold. As for the wire fabric, one having the following specifications as shown in Table 1 made by Osaka Screen Co., Ltd. is used herein.

TABLE 1

| Material | SUS304-W1 (Japanese Industrial Standard) |
|---|---|
| Wire Diameter | φ 0.25 |
| Pitch | 3.5 × 3.5 |
| Width | 40 mm |
| Texture | knitted |

In the next Step S2, the tubularly wound wire fabric is pressed with the preliminary mold, thus fabricating a preliminarily molded part of a simple wire fabric. The preliminarily molded wire fabric has a shape similar to the gasket as an end product. However, the preliminarily molded wire fabric is formed in a manner that an outside diameter thereof is slightly smaller than the end product, meanwhile, an inside diameter thereof is slightly larger than the end product, so as to be readily set inside a main mold to be described later. Actual measurement of density of this preliminarily molded wire fabric was in a range between 2.67 to 2.97 $g/cm^3$. Then, in the next Step S3, the above-described preliminarily molded wire fabric is immersed for about 5 minutes into an aqueous solution of the heat-resistant filler rendered flowable by agitation under atmospheric pressure (an atmospheric immersion process) so as to fill the aqueous solution of the heat-resistant filler into gaps of the reinforcing member 4 made of the preliminarily molded wire fabric, and then the reinforcing member 4 is pulled out after the heat-resistant filler is solidified inside and around the reinforcing member 4 by a thixotropic phenomenon.

Note that the composition of the aqueous solution of the heat-resistant filler herein is as shown in the following Table 2. The aqueous solution is prepared in accordance with the following process of: pouring a given amount of ion-exchange water into a container; adding synthetic bentonite such as one shown in the following Table 3 ("Synthetic Smectite SWF-100" made by Co-op Chemical Co. Ltd.) slowly up to the composition described in Table 2, while agitating the ion-change water at a room temperature so as to prepare a thixotropic transparent fluid; adding diatomaceous earth such as one shown in the following Table 4 ("Radiolite F" made by Showa Chemical Industry Co. Ltd.) to the above-described mixture slowly up to the composition described in Table 2 in a state of high agitation; and agitating the mixture enough to prepare the aqueous solution as a thixotropic nebulous dispersant fluid.

TABLE 2

| Ingredients | Weight (%) |
|---|---|
| Synthetic Bentonite | 1.2 |
| Diatomaceous Earth | 16.5 |
| Water | 82.0 |
| Others | 0.3 |

TABLE 3

| Product Name | Synthetic Smectite |
|---|---|
| Product Code | SWF-100 |
| Aspect | water-soluble |
| Viscosity (CP) | |
| 6 rpm | $7.2 \times 10^3$ |
| 60 rpm | $8.1 \times 10^2$ |
| Thixotropic Index | 8.9 |

TABLE 4

| Product Name | Radiolite |
|---|---|
| Product Code | F |
| Aspect | white powder |
| Average Grain Size μm | 6.4 |
| pH | 8 to 11 |

Instead of the above-described Step S3, as a reduced pressure immersion a low-pressure immersion process of the heat-resistant filler may be performed in Step S4. This low-pressure immersion process is conducted in accordance with the following processes of: putting the reinforcing member 4, which is the preliminarily molded part of the simple wire fabric, and the aqueous solution of the heat-resistant filler separately into a decompression chamber preferably at 10 Torr or less for deaerating physically-adsorbed gas and dissolved gas, respectively; immersing the preliminarily molded wire fabric for about 5 minutes into the aqueous solution of the heat-resistant filler rendered flowable by agitation in the decompression chamber at a decompression value similar to the foregoing in order to fill the aqueous solution of the heat-resistant filler into the gaps of the reinforcing member 4 made of the preliminarily molded wire fabric; and pulling out the reinforcing member 4 after the heat-resistant filler is solidified inside and around the reinforcing member 4 according to the thixotropic phenomenon.

In the next Step S5, the reinforcing member 4 thus filled with the heat-resistant filler 7 in the gaps thereof is subjected to a heating process for 30 to 40 minutes with a hot-air dryer at 100° C. for dehydrating the heat-resistant filler 7, and then cooled down to a room temperature to form the gasket basic substance 8. Subsequently in Step S6, the gasket basic substance 8 is immersed into an aqueous solution of the heat-resistant antifriction material for about 2 to 3 minutes under atmospheric pressure (an atmospheric immersion process), thus coating the heat-resistant antifriction material on the surface of the gasket basic substance 8.

Note that the composition of the aqueous solution of the heat-resistant antifriction material herein is as shown in the following Table 5. The aqueous solution is prepared in accordance with the following process of: pouring a given amount of PTFE dispersion such as one shown in the following Table 6 ("Polyflon TFE Dispersion D-1" made by Daikin Industries, Ltd.) and a given amount of boron nitride dispersion such as one shown in the following Table 7 ("Lu-BN LBN5026" made by Showa Denko K. K.) into an agitation container, respectively in accordance with the composition described in Table 5; and slowly adding a given amount of boron nitride powder such as one shown in the following Table 8 ("SHO-BN UHP-1" made by Showa Denko K. K.) corresponding to the composition described in Table 5, while agitating the above-described mixture at a room temperature so as to prepare the aqueous solution as a dilatant (smooth when spread over a hand) and nebulous impregnating fluid. Incidentally, basic properties of boron nitride is as shown in Table 9, and antifriction action thereof is observed up to some 950° C. under oxidizing atmosphere (in the air).

TABLE 5

| Ingredients | Weight (%) |
| --- | --- |
| PTFE Dispersion | 29.8 |
| Boron Nitride Dispersion | 59.2 |
| Boron Nitride Powder | 10.7 |
| Others | 0.3 |

TABLE 6

| Product Name | Polyflon TFE Dispersion |
| --- | --- |
| Product Code | D-1 |
| Aspect | aqueous nebulous fluid |
| Solid Content (wt %) | about 60 |
| Average Grain Size (μm) | about 0.25 |
| Specific Gravity | about 1.5 |
| Viscosity | about 25 |
| pH | about 10 |

TABLE 7

| Product Name | Lu-BN LBN |
| --- | --- |
| Product Code | LBN 5026 (aqueous type) |
| Aspect | white liquid |
| Main Ingredients | boron nitride 20% |
| | dispersant 4% |
| | water 76% |
| Specific Gravity | 1.15 |
| Viscosity (CP) | 45 |

TABLE 8

| Product Name | SHO-BN |
| --- | --- |
| Product Code | UHP-1 |
| Aspect | white scale powder |
| Bulk Density (g/cm$^3$) | 0.30 (vibration mode) |
| Average Grain Size (μm) | 7 to 10 |
| Specific Surface Area (m$^2$) | 5.5 (BET method) |

TABLE 9

| Aspect | white powder |
| --- | --- |
| Chemical Formula | BN |
| Absolute Specific Gravity | 2.27/cm$^3$ |
| Crystal System | hexagonal |
| Melting Point | 3000° C. to 3400° C. (N$_2$) |
| Refractive Index | 1.74 |

In the next Step S7, the gasket basic substance 8 coated with the heat-resistant antifriction material is subjected to a heating process for 30 to 40 minutes with a hot-air dryer at a temperature in a range from 140° C. to 150° C. and the heat-resistant antifriction material is baked, thus forming filmlike coverture 9 of the heat-resistant antifriction material by resinifying PTFE. In the subsequent Step S8, the gasket basic substance 8 coated with the heat-resistant antifriction material is set in a main mold and then pressed with the main mold to form the gasket 6 as an end product in accordance with regular dimensions and shape.

According to the gasket 6 for a high-temperature joint of this embodiment, the gasket basic substance 8 is formed by filling the heat-resistant filler 7 mainly composed of diatomaceous earth into the gaps of the meshed metallic reinforcing member 4, and the surface of the gasket basic substance 8 is covered with the coverture 9 made of the heat-resistant antifriction material mainly composed of the mixture of boron nitride and polytetrafluoroethylene resin. Accordingly, unlike a conventional one using a heat-resistant sheet 3 made of combustible graphite, the gasket basic substance 8 and the coverture 9 are not sublimated or decomposed if the gasket 6 is used at a high temperature above 500° C. Therefore, according to the gasket 6 for a high-temperature joint of this embodiment, it is possible to maintain a high sealing property for a long period under a high temperature.

Moreover, according to the gasket 6 for a high-temperature joint of this embodiment, the surface of the gasket basic substance 8 is covered with the coverture 9 made of the heat-resistant antifriction material mainly composed of the mixture of boron nitride and polytetrafluoroethylene resin. Accordingly, the gasket 6 possesses high heat resistance and a low coefficient of friction on the surface thereof. Therefore, according to the gasket 6 for a high-temperature joint of this embodiment, the reinforcing member 4 and the joint 1 can be smoothly slid inside the joint 1 owing to slidable contact therebetween, thus effectuating interception of engine vibration.

Furthermore, according to the gasket 6 for a high-temperature joint of this embodiment, the meshed metallic reinforcing member 4 is made of stainless wires. Accordingly, it is possible to enhance heat resistance and corrosion resistance of the reinforcing member 4, thus effectuating longer usage of the gasket 6.

Meanwhile, according to the fabricating method of this embodiment, the heat-resistant filler 7 in the state of an aqueous solution mainly composed of diatomaceous earth is filled into the gaps of the meshed metallic reinforcing member 4 pre-formed with the preliminary mold. Accordingly, the heat-resistant filler 7 can be readily filled into the gaps of the reinforcing member 4. Thereafter, the gasket basic substance 8 is formed in a manner that the reinforcing member 4 is pulled out after the heat-resistant filler 7 is solidified by the thixotropic phenomenon and then the heat-resistant filler 7 is dried out. Accordingly, dripping off hardly occurs when the reinforcing member 4 is pulled out of the aqueous solution of the heat-resistant filler 7. Therefore, it is possible to retain the heat-resistant filler 7 easily and securely inside the gaps of the reinforcing member 4, whereby the gasket basic substance 8 can be efficiently formed.

Thereafter, the surface of the gasket basic substance 8 is covered with the heat-resistant antifriction material mainly composed of the mixture of boron nitride and polytetrafluoroethylene resin, and then the gasket basic substance 8 is formed into the predetermined dimensions and shape with the main mold. Accordingly, it is possible to fabricate the gasket for a high-temperature joint in accurate dimensions and shape, of which the surface is covered sufficiently with the coverture 9 of the heat-resistant antifriction material.

In addition, the aqueous solution of the heat-resistant filler according to the fabricating method of this embodiment which is mainly composed of diatomaceous earth is composed of total 100 wt % in combination with water within 85 wt %, diatomaceous earth within 20 wt % and synthetic bentonite within 5 wt %. In particular, the aqueous solution is composed of 82.0 wt % of water, 16.5 wt % of diatomaceous earth and 1.2 wt % of synthetic bentonite. Accordingly, the aqueous solution of the heat-resistant filler 7 possesses sufficient flowability, whereby the heat-resistant filler 7 can be readily filled into the gaps of the reinforcing member 4, and synthetic bentonite enables the aqueous solution of the heat-resistant filler 7 to cause the thixotropic phenomenon.

Furthermore, according to the fabricating method of this embodiment, the above-described Step S4 can be adopted when the heat-resistant filler 7 in the state of the aqueous solution mainly composed of diatomaceous earth is filled into the gaps of the meshed metallic reinforcing member 4, whereby the reinforcing member 4 and the aqueous solution of the heat-resistant filler 7 are severally deaerated under reduced pressure atmosphere and then the reinforcing member 4 is immersed into the aqueous solution of the heat-resistant filler 7. In this way, it is surely possible to prevent bubbles from remaining inside the heat-resistant filler 7, whereby strength of the gasket basic substance 8 can be enhanced.

Figure 3:
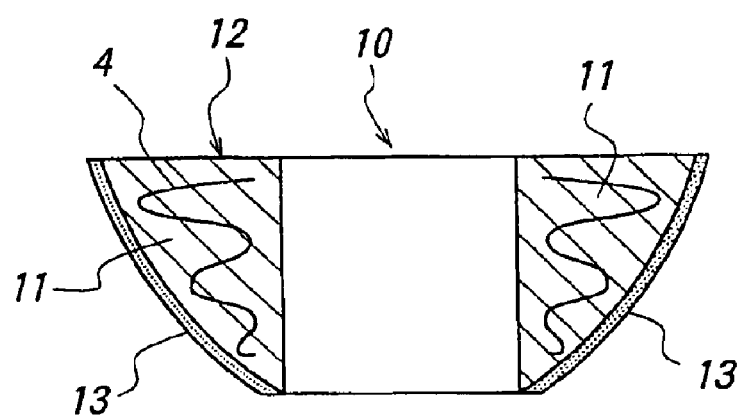
FIG. 3 is an outlined cross-sectional view showing another embodiment of a gasket for a high-temperature joint according to this invention.

FIG. 3 is a cross-sectional view showing a gasket for a high-temperature joint according to another embodiment of this invention. In the drawing, similar parts to the conventional example will be denoted by the same reference numerals.

A gasket 10 of this embodiment includes a gasket basic substance 12 formed by filling a heat-resistant antifriction material 11 mainly composed of a mixture of boron nitride and polytetrafluoroethylene resin into gaps of a meshed metallic reinforcing member 4, and coverture 13 made of the heat-resistant antifriction material for covering a surface of the gasket basic substance 12.

Figure 4:
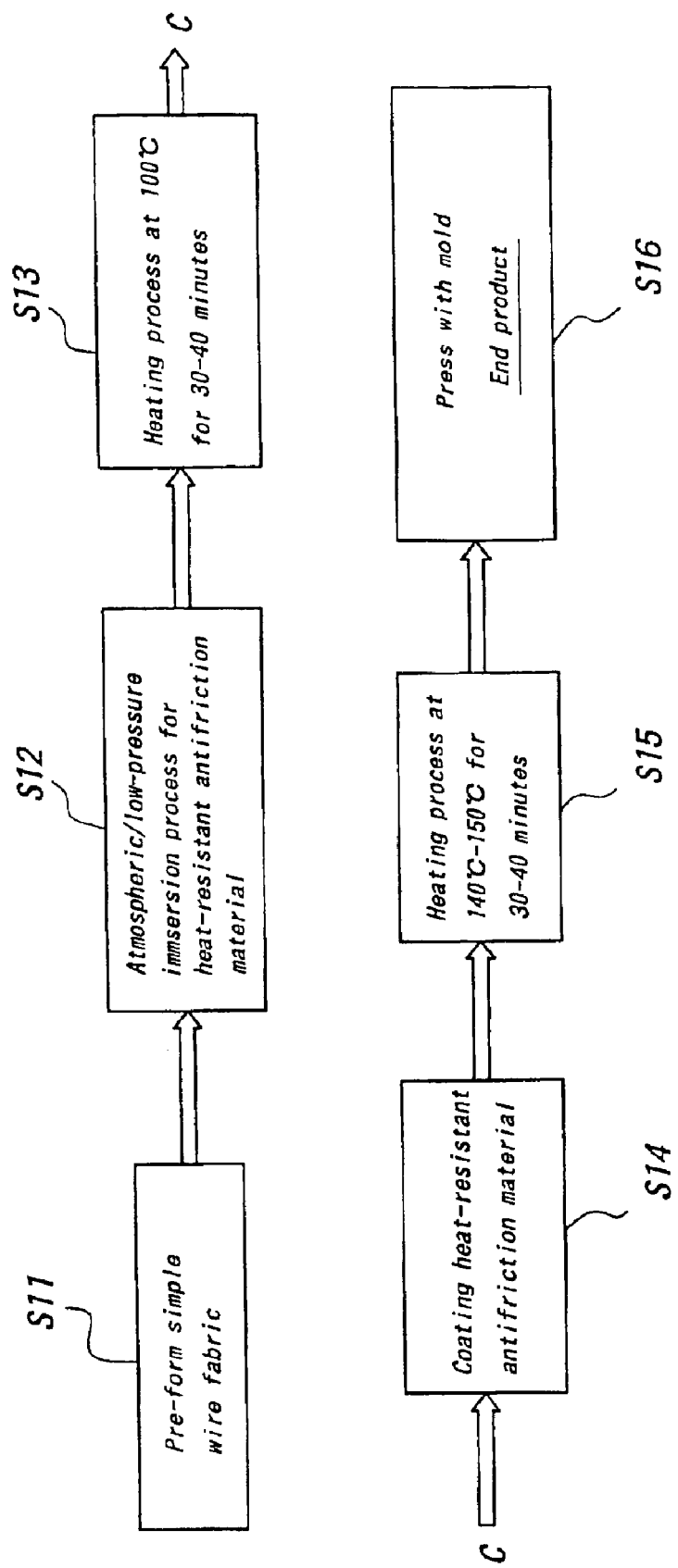
FIG. 4 is a process chart showing one embodiment of the fabricating method according to this invention for use in fabrication of the gasket for a high-temperature joint of the foregoing embodiment.
Figure 5:
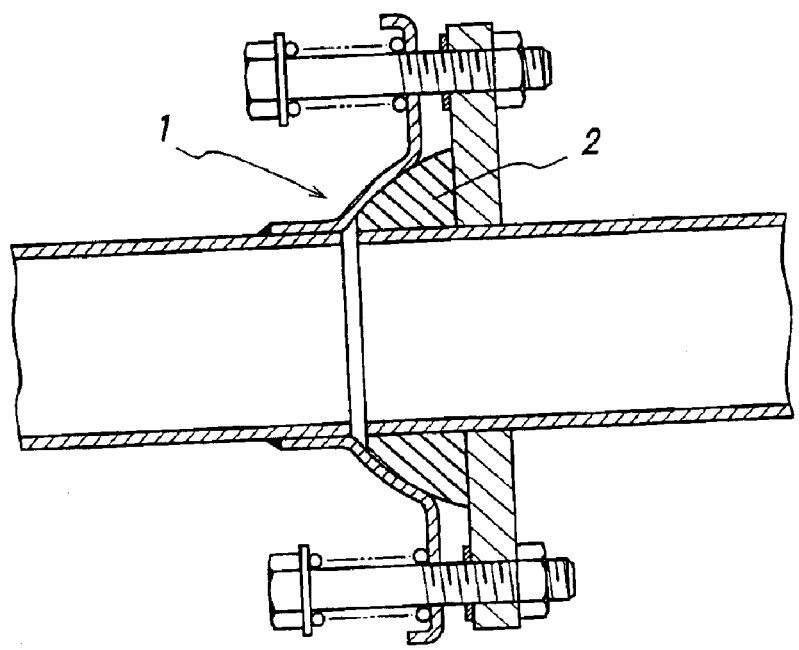
FIG. 5 is an outlined cross-sectional view showing a conventional gasket for a joint.
Figure 6A:
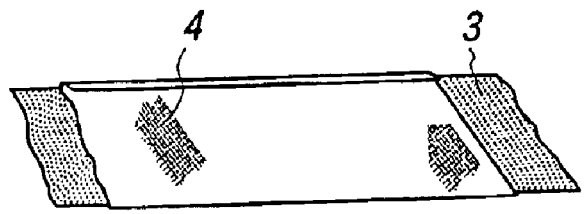
FIG. 6A is a perspective view showing a reinforcing member and a heat-resistant sheet used for fabrication of the conventional gasket for a joint.
Figure 6B:
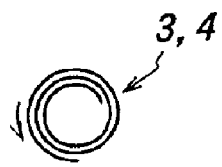
FIG. 6B is a plan view showing a tubularly wound object composed of the heat-resistant sheet and the reinforcing member.
Figure 6C:
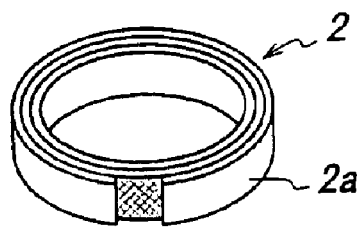
FIG. 6C is a perspective view with a partial section showing the conventional gasket for a joint after forming the tubularly wound object.
Figure 6D:
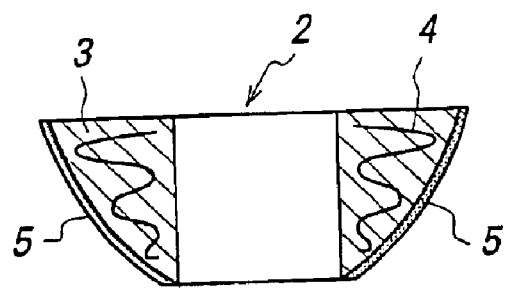
FIG. 6D is a cross-sectional view showing a structure of the conventional gasket for a joint.

The gasket 10 of this embodiment is fabricated as described below in accordance with a fabricating method as shown in FIG. 4, which is another embodiment of a fabricating method of this invention. Specifically, here in Step S11 as shown in FIG. 4, a tubularly wound object made of braid-over-braid knitted stainless wire fabric as the reinforcing member 4 is set inside a preliminary mold as similar to the foregoing Step S1. Then, the tubularly wound wire fabric is pressed with the preliminary mold, thus fabricating a preliminarily molded part of a simple wire fabric. The preliminarily molded wire fabric also has a shape similar to the gasket as an end product. However, the preliminarily molded wire fabric is formed in a manner that an outside diameter thereof is slightly smaller than the end product, meanwhile, an inside diameter thereof is slightly larger than the end product, so as to be readily set inside a main mold to be described later. Note that the one used in the foregoing embodiment, which has the specifications as shown in Table 1 made by Osaka Screen Co., Ltd., is also used for the wire fabric herein. Actual measurement of density of this preliminarily molded wire fabric was in a range between 2.67 to 2.97 g/cm³.

Then, in the next Step S12, the above-described preliminarily molded wire fabric is immersed for about 5 minutes into an aqueous solution of the heat-resistant antifriction material rendered flowable by still standing under atmospheric pressure (an atmospheric immersion process) so as to fill the aqueous solution of the heat-resistant antifriction material into gaps of the reinforcing member 4 made of the preliminarily molded wire fabric, and then the reinforcing member 4 is pulled out after the heat-resistant antifriction material is solidified inside and around the reinforcing member 4 according to a dilatancy phenomenon by agitating the heat-resistant antifriction material vigorously. Note that the aqueous solution of the heat-resistant antifriction material made of the mixture mainly composed of boron nitride and polytetrafluoroethylene resin of the composition as shown in Table 5, which is used in the foregoing embodiment, is also used herein as the aqueous solution of the heat-resistant antifriction material.

Instead of an atmospheric immersion process, as a reduced pressure immersions a low-pressure immersion process of the heat-resistant antifriction material may be performed in Step S12. This low-pressure immersion process is conducted in accordance with the following processes of: putting the reinforcing member 4, which is the preliminarily molded part of the simple wire fabric, and the aqueous solution of the heat-resistant antifriction material separately into a decompression chamber preferably at 10 Torr or less for deaerating physically-adsorbed gas and dissolved gas, respectively; immersing the preliminarily molded wire fabric for about 5 minutes into the aqueous solution of the heat-resistant antifriction material rendered flowable by still standing in the decompression chamber at a decompression value similar to the foregoing in order to fill the aqueous solution of the heat-resistant antifriction material into the gaps of the reinforcing member 4 made of the preliminarily molded wire fabric; and pulling out the reinforcing member 4 after the heat-resistant antifriction material is solidified inside and around the reinforcing member 4 according to the dilatancy phenomenon by agitating the heat-resistant antifriction material vigorously.

In the next Step S13, the reinforcing member 4 thus filled with the heat-resistant antifriction material 11 in the gaps thereof is subjected to a heating process for 30 to 40 minutes with a hot-air dryer at 100° C. for dehydrating the heat-resistant antifriction material 11, and then cooled down to a room temperature to form the gasket basic substance 12. Subsequently in Step S14, the gasket basic substance 12 is immersed into the aqueous solution of the heat-resistant antifriction material 11 for about 2 to 3 minutes under atmospheric pressure (an atmospheric immersion process), thus coating the heat-resistant antifriction material 11 on the surface of the gasket basic substance 12.

In the next Step S15, the gasket basic substance 12 coated with the heat-resistant antifriction material 11 is subjected to a heating process for 30 to 40 minutes with a hot-air dryer at a temperature in a range from 140° C. to 150° C. and the heat-resistant antifriction material is baked, thus forming filmlike coverture 13 of the heat-resistant antifriction material by resinifying PTFE. In the subsequent Step S16, the gasket basic substance 12 coated with the heat-resistant antifriction material 11 is set in a main mold and then pressed with the main mold to form the gasket 10 as an end product in accordance with regular dimensions and shape.

According to the gasket 10 for a high-temperature joint of this embodiment, the gasket basic substance 12 is formed by filling the heat-resistant antifriction material 11 mainly composed of the mixture of boron nitride and polytetrafluoroethylene resin into the gaps of the meshed metallic reinforcing member 4, and the surface of the gasket basic substance 12 is covered with the coverture 13 made of the heat-resistant antifriction material 11 mainly composed of the mixture of boron nitride and polytetrafluoroethylene resin as similar to the foregoing. Accordingly, unlike the conventional one using the heat-resistant sheet 3 made of combustible graphite, the gasket basic substance 12 and the coverture 13 are not sublimated or decomposed if the gasket 10 is used at a high temperature above 500° C. Therefore, according to the gasket 10 for a high-temperature joint of this embodiment, it is possible to maintain a high sealing property for a long period under a high temperature.

Moreover, according to the gasket 10 for a high-temperature joint of this embodiment, the surface of the gasket basic substance 12 is covered with the coverture 13 made of the heat-resistant antifriction material mainly composed of the mixture of boron nitride and polytetrafluoroethylene resin. Accordingly, the gasket 10 possesses high heat resistance and a low coefficient of friction on the surface thereof. Therefore, according to the gasket 10 for a high-temperature joint of this embodiment, the reinforcing member 4 and the joint 1 can prevent occurrence of abnormal friction sounds inside the joint 1 attributable to slidable contact thereof, and smooth sliding of the joint 1 can be effectuated.

Furthermore, according to the gasket 10 for a high-temperature joint of this embodiment, the meshed metallic reinforcing member 4 is made of stainless wires. Accordingly, it is possible to enhance heat resistance and corrosion resistance of the reinforcing member 4, thus effectuating longer usage of the gasket 10.

Meanwhile, according to the fabricating method of this embodiment, the heat-resistant antifriction material 11 in the state of an aqueous solution mainly composed of the mixture of boron nitride and polytetrafluoroethylene resin is filled into the gaps of the meshed metallic reinforcing member 4 pre-formed with the preliminary mold. Accordingly, the heat-resistant antifriction material 11 can be readily filled into the gaps of the reinforcing member 4. Thereafter, the gasket basic substance 12 is formed in a manner that the reinforcing member 4 is pulled out after the heat-resistant antifriction material 11 is solidified by the dilatancy phenomenon and then the heat-resistant antifriction material 11 is dried out. Accordingly, dripping off hardly occurs when the reinforcing member 4 is pulled out of the aqueous solution of the heat-resistant antifriction material 11. Therefore, it is possible to retain the heat-resistant antifriction material 11 easily and securely inside the gaps of the reinforcing member 4, whereby the gasket basic substance 12 can be efficiently formed.

Thereafter, the surface of the gasket basic substance 12 is covered with the heat-resistant antifriction material 11 mainly composed of the mixture of boron nitride and polytetrafluoroethylene resin, and then the gasket basic substance 12 is formed into the predetermined dimensions and shape with the main mold. Accordingly, it is possible to fabricate the gasket for a high-temperature joint in accurate dimensions and shape, of which the surface is covered sufficiently with the coverture 13 of the heat-resistant antifriction material 11.

Note that the aqueous solution of the heat-resistant antifriction material is composed of total 100 wt % in combination with boron nitride dispersion within 90 wt % containing 20 wt% boron nitride, polytetrafluoroethylene resin dispersion within 70 wt % containing 60 wt % polytetrafluoroethylene resin solid, and boron nitride powder within 20 wt %. In particular, the aqueous solution is composed of 29.8% of boron nitride dispersion containing 20 wt % boron nitride, 59.2% of polytetrafluoroethylene resin dispersion containing 60 wt % polytetrafluoroethylene resin solid and 10.7 % of boron nitride powder. Accordingly, the aqueous solution of the heat-resistant antifriction material 11 possesses sufficient flowability, whereby the heat-resistant antifriction material 11 can be readily filled into the gaps of the meshed metallic reinforcing member 4, and boron nitride powder enables the aqueous solution of the heat-resistant antifriction material 11 to cause the dilatancy phenomenon.

Furthermore, according to the fabricating method of this embodiment, if the reinforcing member 4 and the aqueous solution of the heat-resistant antifriction material 11 are severally deaerated under reduced pressure atmosphere and then the reinforcing member 4 is immersed into the aqueous solution of the heat-resistant antifriction material 11 when the heat-resistant antifriction material 11 in the state of the aqueous solution mainly composed of the mixture of boron nitride and polytetrafluoroethylene resin is filled into the gaps of the meshed metallic reinforcing member 4, then it is surely possible to prevent bubbles from remaining inside the heat-resistant antifriction material 11, whereby strength of the gasket basic substance 12 can be enhanced.

Although description has been made regarding this invention based on the illustrated embodiments, it should be understood that the invention will not be limited to the embodiments described above. It is needless to say that various constituents of the invention including the shape of the gasket, the constitution of the reinforcing member, the compositions of the heat-resistant filler as well as the heat-resistant antifriction material and the like, for example, may be discretionarily modified within scope of the invention as defined by the appended claims.

For example, a woollike substance such as steel wool, which is a mass of fine steel threads twisted together, can be also used as the metallic reinforcing member. Moreover, mainly synthetic mica or a mixture mainly composed of synthetic mica and diatomaceous earth can be also used as the heat-resistant filler. Furthermore, it is also possible to use mainly just one of boron nitride and polytetrafluoroethylene resin for the heat-resistant antifriction material.

What is claimed is:

1. A method of fabricating a gasket for a high-temperature joint comprising the steps of:

filling a heat-resistant filler in a state of an aqueous solution mainly composed of any of diatomaceous earth, synthetic mica and a mixture thereof into gaps of any one of a pre-formed meshed metallic reinforcing member and a pre-formed woollike metallic reinforcing member;

forming a gasket basic substance by solidifying said heat-resistant filler according to a thixotropic phenomenon and by drying subsequently;

covering a surface of said gasket basic substance with a heat-resistant antifriction material mainly composed of any of boron nitride, polytetrafluoroethylene resin and a mixture thereof; and forming said gasket basic substance into predetermined dimensions and shape.

2. The method of fabricating a gasket for a high-temperature joint according to claim 1, wherein said aqueous solution of said heat-resistant filler mainly composed of diatomaceous earth, synthetic mica or a mixture thereof is composed of total 100 wt % in combination with water within 85 wt %, any of diatomaceous earth, synthetic mica and a mixture thereof within 20 wt %, and synthetic bentonite within 5 wt %.

3. The method of fabricating a gasket for a high-temperature joint according to claim 2, wherein said reinforcing member and said aqueous solution of any of the heat-resistant filler and the heat-resistant antifriction material are severally deaerated under reduced pressure atmosphere and then said reinforcing member is immersed into said aqueous solution under reduced pressure atmosphere in said step of filling any of said heat-resistant filler and said heat-resistant antifriction material in the state of said aqueous solution into said gaps of the metallic reinforcing member.

4. The method of fabricating a gasket for a high-temperature joint according to claim 3, wherein said meshed metallic reinforcing member is made of metallic wires.

5. The method of fabricating a gasket for a high-temperature joint according to claim 2, wherein said meshed metallic reinforcing member is made of metallic wires.

6. The method of fabricating a gasket for a high-temperature joint according to claim 1, wherein said reinforcing member and said aqueous solution of any of the heat-resistant filler and the heat-resistant antifriction material are severally deaerated under reduced pressure atmosphere and then said reinforcing member is immersed into said aqueous solution under reduced pressure atmosphere in said step of filling any of said heat-resistant filler and said heat-resistant antifriction material in the state of said aqueous solution into said gaps of the metallic reinforcing member.

7. The method of fabricating a gasket for a high-temperature joint according to claim 6, wherein said meshed metallic reinforcing member is made of metallic wires.

8. The method of fabricating a gasket for a high-temperature joint according to claim 1, wherein said meshed metallic reinforcing member is made of metallic wires.

* * * * *